Inventor
JOSEPH D. RYAN.
By Frank Fraser
Attorney

Patented Apr. 7, 1942

2,279,145

UNITED STATES PATENT OFFICE 2,279,145

LAMINATED SAFETY GLASS AND PLASTIC THEREFOR

Joseph D. Ryan, Toledo, Ohio, assignor to Libbey-Owens-Ford Glass Company, Toledo, Ohio, a corporation of Ohio Application April 28, 1937, Serial No. 139,516

6 Claims. (Cl. 49—81.5)

The present invention relates to laminated safety glass and more particularly to such a glass made with a synthetic resin plastic which has been plasticized with an aliphatic organic acid ester of an ether of diethylene glycol. This application corresponds to and is identical with my application Serial No. 63,066, filed February 10, 1936.

Laminated safety glass has in the past ordinarily been made by bonding a layer of cellulose derivative plastic such as cellulose nitrate plastic or cellulose acetate plastic between two sheets of glass. These plastics have at least one common characteristic, namely, a tendency toward brittleness at the lower temperatures such as, for example, zero degrees F.

Much work has been done in an attempt to produce a plastic offering greater resistance to impact at all of the normal temperatures to which the glass is ordinarily subjected, than the resistance offered by laminated glass made with the cellulose derivative plastics, and to particularly increase the resistance to impact of safety glass at the lower temperatures.

The synthetic resin field has been explored for some time with the hope of finding or developing a new plastic suitable for safety glass manufacture and superior to cellulose derivative plastics for this purpose. Some attempts have been made to employ resins such as the acrylic acid ester type of resin, but such glass made with the acrylic acid ester as has come to my attention and which is offered on the open market, exhibits the same tendency toward brittleness at the lower temperatures as glass made from the cellulose derivatives.

If the resinous product formed by the reaction of an aldehyde on partially or wholly hydrolyzed polymerized vinyl ester is plasticized with an aliphatic organic acid ester of an ether of diethylene glycol, a very satisfactory plastic is produced. Included in the aliphatic organic acid esters of an ether of diethylene glycol are the ethyl ethers of diethylene glycol esters, such as ethyl ether of diethylene glycol acetate, ethyl ether of diethylene glycol propionate, ethyl ether of diethylene glycol butyrate, ethyl ether of diethylene glycol caproate, and the butyl ethers of diethylene glycol esters such as the butyl ether of diethylene glycol acetate, butyl ether of diethylene glycol propionate, and butyl ether of diethylene glycol caproate.

In producing the resin, partially or wholly hydrolyzed polymerized vinyl ester can be reacted with formaldehyde, giving a Formvar type of resin; butylaldehyde, giving a so-called Butylvar type of resin; or with an acetaldehyde, resulting in an Alvar type of resin. If preferred, the resinous products can be made simultaneously by polymerizing the monomeric vinyl compound and condensing with the selected aldehyde in a hydrolyzing medium, so that the polymerization of the monomeric vinyl compound, hydrolysis of the polymer, and condensation with the aldehyde in these circumstances all take place simultaneously.

It is pertinent to note that while these types of resins have the latent property of giving a plastic offering much greater resistance to impact when bonded between glass sheets than is true with the cellulose derivative plastics, nevertheless this property can only be produced when the resin is properly plasticized, as improper plasticization gives a material much weaker and generally less desirable than the cellulose derivative plastics. To emphasize this, plastic made by plasticizing the Butylvar type of resin with dibutyl tartrate, for example, which is a plasticizer for the resin, when bonded between glass sheets offers no material resistance to impact at low temperatures and is far inferior to laminated safety glass made with cellulose derivative plastics. Furthermore, there is not an adequate bond between the glass and such plastic at the lower temperatures.

On the other hand, by taking the very same resin and plasticizing it with proper amounts of an aliphatic organic acid ester of an ether of diethylene glycol, a very desirable plastic material is created and the resistance to impact, when bonded between glass sheets, is far superior to such glass made with any of the cellulose derivative plastics. It thus obviously follows that the plasticizer employed is of vital importance to the results obtained.

In accordance with this invention, the synthetic resin, whether it be of the Formvar, Alvar, or Butylvar type, is plasticized with approximately 50 parts by weight of the aliphatic organic acid ester of an ether of diethylene glycol. Of course the amount of plasticizer can be varied to suit or meet particular conditions or requirements as is well understood in the plastic art, but I have found that approximately 50 parts gives a plastic well suited for all of the varying temperature conditions to which laminated safety glass is normally subjected when in use in this country. Ordinarily, as the molecular weight of the plasticizer is increased, correspondingly lesser amounts of plasticizer may be used.

In preparing the plastic, I made my own ethyl ether of diethylene glycol propionate, ethyl ether of diethylene glycol butyrate, and ethyl ether of diethylene glycol caproate, as well as the butyl ether of diethylene glycol acetate, propionate, butyrate, and caproate. To show one way in which I have found these plasticizers can be satisfactorily formed, I mixed one mole of aliphatic organic acid ester of an ether of diethylene glycol with one mole of propionic acid and then refluxed this mixture for about four hours using a fractionating condenser so designed as to allow the escape of the water formed in the reaction without appreciable loss of the reacting materials. The product of this reaction may then be fractionally distilled either at normal pressures or, if preferred, this may be carried out in a vacuum. The same procedure works satisfactorily when using the butyric acid or caproic acid. The ethyl ether of diethylene glycol acetate is available on the open market.

Figure 1:
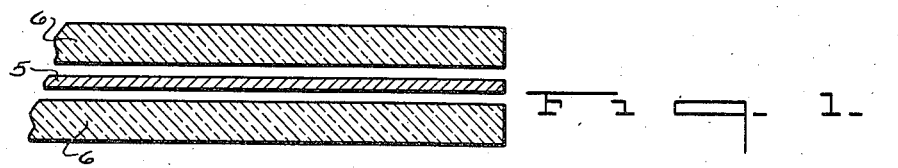
Fig. 1 is a diagrammatic sectional view illustrating the laminations prior to bonding.
Figure 2:
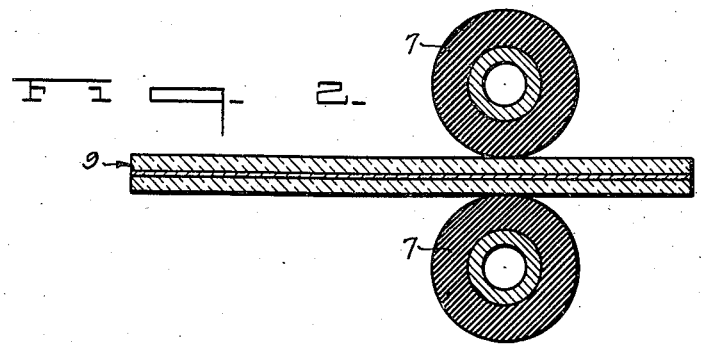
Fig. 2 illustrates pressing of two sheets of glass and an interposed layer of plastic, made in accordance with my invention, by means of nipping rollers.

In Fig. 1, the sheet 5 of Formvar, Butylvar, or Alvar type of resin, plasticized with an aliphatic organic acid ester of an ether of diethylene glycol, is shown as being arranged between two sheets of glass 6. The sheet 5 is a preformed sheet and may include approximately 50 parts by weight of plasticizer. Adhesives or other suitable bond inducing mediums may be used in accordance with my invention.

Figure 3:
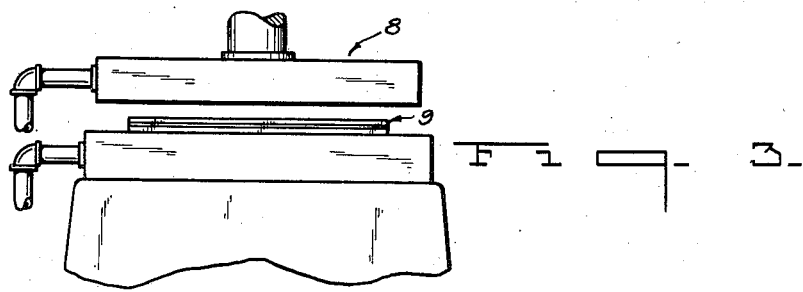
Fig. 3 shows diagrammatically final compositing of the laminations by means of a platen press.

After assembly of the laminations, they are subjected to necessary heat and pressure treatment to bring about permanent adhesion and this may be done by first subjecting the sandwich 9 to a preliminary pressing such as by means of the nipping rollers 7 which can be provided with rubber or other yielding or compressible facing. The nipping rollers 7 are designed to exclude or expel air from between the laminations and to at least initially bond the laminations together. Following this initial pressing step, the sandwich may then be further pressed to effect final compositing in any of the well known pressing devices known in the art. In Fig. 3, the platen press 8 is shown wherein the sandwich is arranged between the platens and there subjected to the requisite heat and pressure treatment. If preferred, this final compositing can take place in an autoclave wherein the glass is placed in a tank and there acted upon by a fluid under pressure and at a proper temperature.

Figure 4:
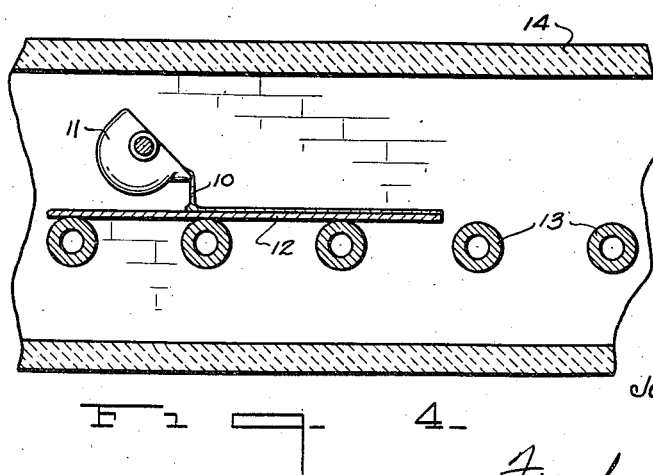
Fig. 4 is a fragmentary vertical sectional view showing flowing of the resin plastic upon glass sheets.

In lieu of using a preformed sheet, the plastic mass may be flowed, extruded, or otherwise placed upon the glass as shown in Fig. 4, wherein the plastic 10 is flowed from the receptacle 11 upon the glass sheet 12 supported on the roller conveyor 13.

To facilitate proper spreading or application of the plastic mass upon the glass, its temperature may be controlled and volatile solvents may be added. If the volatile solvents are included in the mix, it is of course necessary to remove excess solvent before laminating and to permit this, the conveyor 13 is shown as being arranged in the tunnel 14 so that the coated glass can be passed through or held in an atmosphere the temperature and humidity of which is so controlled as to give proper seasoning or drying.

Following preparation of the glass sheets in this way, two of such coated sheets may then be bonded together with or without the aid of adhesives or other bond inducing mediums.

It will be found that with laminated safety glass made with any of these forms of resin plasticized with the aliphatic organic acid ester of an ether of diethylene glycol, the composited structure offers much greater resistance to impact at high, low, and intermediate temperatures than any of such glass made with cellulose derivative plastics.

I claim:

1. Laminated safety glass comprising two sheets of glass and an interposed adherent layer of transparent synthetic resin plastic composed of the resinous product formed by the reaction of an aldehyde on partially or wholly hydrolyzed polymerized vinyl ester plasticized with an aliphatic organic acid ester of an ether of diethylene glycol having a single esterifiable hydroxyl group.

2. Laminated safety glass comprising two sheets of glass and an interposed adherent layer of transparent synthetic resin plastic composed of the resinous product formed by the reaction of formaldehyde on partially or wholly hydrolyzed polymerized vinyl ester plasticized with an aliphatic organic acid ester of an ether of diethylene glycol having a single esterifiable hydroxyl group.

3. Laminated safety glass comprising two sheets of glass and an interposed adherent layer of transparent synthetic resin plastic composed of the resinous product formed by the reaction of acetaldehyde on partially or wholly hydrolyzed polymerized vinyl ester plasticized with an aliphatic organic acid ester of an ether of diethylene glycol having a single esterifiable hydroxyl group.

4. Laminated safety glass comprising two sheets of glass and an interposed adherent layer of transparent synthetic resin plastic composed of the resinous product formed by the reaction of butylaldehyde on partially or wholly hydrolyzed polymerized vinyl ester plasticized with an aliphatic organic acid ester of an ether of diethylene glycol having a single esterifiable hydroxyl group.

5. Laminated safety glass comprising two sheets of glass and an interposed adherent layer of transparent synthetic resin plastic composed of the resinous product formed by the reaction of an aldehyde on partially or wholly hydrolyzed polymerized vinyl ester plasticized with an ethyl ether of diethylene glycol ester.

6. Laminated safety glass comprising two sheets of glass and an interposed adherent layer of transparent synthetic resin plastic composed of the resinous product formed by the reaction of an aldehyde on partially or wholly hydrolyzed polymerized vinyl ester plasticized with a butyl ether of diethylene glycol ester.

JOSEPH D. RYAN.